March 30, 1948.   A. WARING   2,438,794
PACKING OR SEALING RING
Filed Feb. 8, 1946

INVENTOR:
ARTHUR WARING
BY

Patented Mar. 30, 1948

2,438,794

UNITED STATES PATENT OFFICE 2,438,794

PACKING OR SEALING RING

Arthur Waring, Birmingham, England

Application February 8, 1946, Serial No. 646,273
In Great Britain September 1, 1945

3 Claims. (Cl. 288—3)

This invention refers to certain improvements in packing or sealing ring devices of the type fixed in a stationary housing and having an annular sealing lip which bears on a shaft or the like and having a helical spring in the form of a garter which bears on the lip to press the same on the shaft. Should the shaft run eccentrically in relation to the packing ring the annular lip is distorted and a gap may be formed between the sealing lip and the shaft so that the efficiency of the seal is affected. This invention has for its object to obviate this defect.

According to the present invention, a ring is arranged around the garter spring and is floatingly mounted so that it can move with the spring and tend to keep the spring garter in contact with the lip and hold it in pressure contact entirely around the shaft under all conditions of distortion, such as the distortion caused by the shaft running eccentric. Any such distortion of the shaft will cause the lip to distort on one side, producing a movement of the spring which is transferred to the ring, and the ring will thus move with the spring and pull the spring concentric with the shaft. Thus the garter spring will apply an efficient pressure entirely around the sealing lip when so distorted.

Referring to the drawings.

Figure 1:
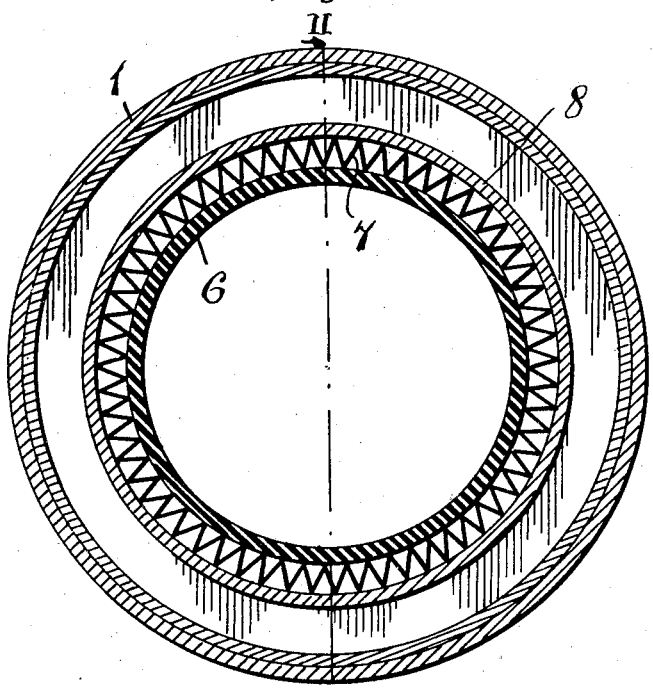
Figure 1 is a section on line I—I of Figure 2 of a sealing ring device embodying the invention.
Figure 2:
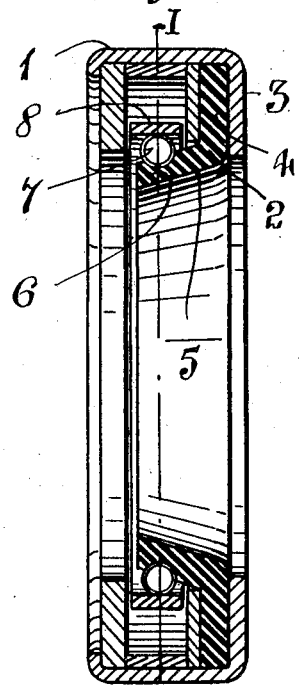
Figure 2 is a section on line II—II of the device of Figure 1.
Figure 3:
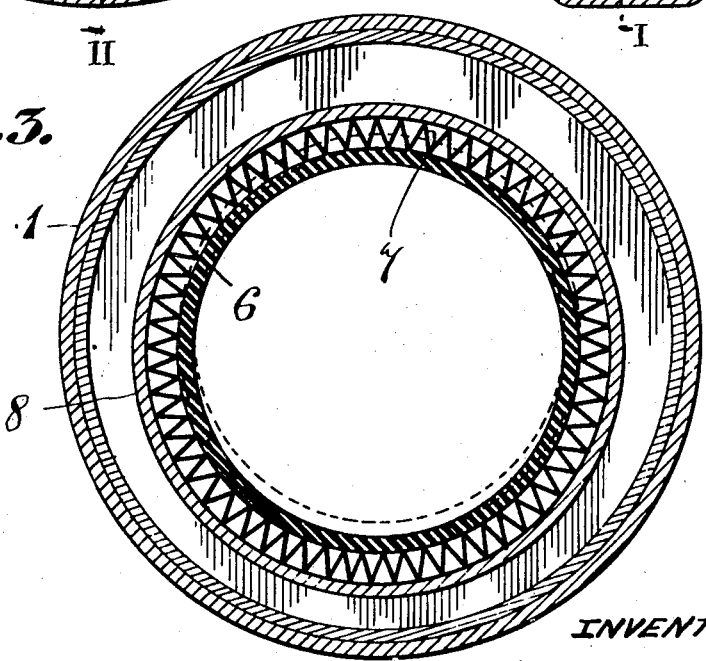
Figure 3 is a similar view to Figure 1, but illustrating the position of the sealing lip distorted.

According to a convenient embodiment of this invention, the sealing device is of the type comprising a metal casing 1 which is a push fit in a housing surrounding the shaft. A leather, rubber or like pealing washer 2, L-shaped in cross section, is fixed in the casing 1, one flange 4 being fixed against the face of the end flange 3 of the casing, while the other flange 5 of the washer 2 inclines inwardly and forms a sealing lip 6 bearing on the shaft. A garter spring 7 formed of helically coiled wire bears on the outer periphery of the sealing lip 6 and applies pressure holding the lip in the sealing position. A cylindrical ring 8 is placed around the garter spring so that it is substantially in contact with the periphery of the spring when in position on the sealing lip which in turn is applied with sealing pressure around a shaft (not shown). If a local pressure is placed on one side of the sealing lip, as for instance when a shaft is running eccentric, the lip is distorted at one side radially outwards from the position shown in dotted lines to the position in full lines Figure 3, and consequently moves the spiral spring 7 locally in the same direction. The spiral garter spring 7 bears on the ring 8 and the ring moves outwardly with the spring. The other side of the ring therefore moves inwardly and causes the spring 7 to move inwardly and thus tends to assume a position concentric with the shaft, tending to hold the spiral spring concentric with the shaft to give a sealing pressure entirely round the lip when distorted. When the ring 8 is not present, any undue pressure on one side of the sealing lip 6 due to eccentricity of the shaft, causes the lip to shift away from the shaft on the diametrically opposite side, thus breaking down the seal. The ring 8 is prevented from lateral disengagement from the garter spring 7 and this is conveniently effected by the ring 8 being constrained to have a radial movement between internal walls of the sealing device. By this invention therefore an effective even pressure of the sealing lip is maintained under all conditions. Furthermore the ring 8 surrounding the garter spring 7 can cause the coils of the spring to be distorted radially and thus increase the effectiveness of the spring by a squeezing pressure.

Having thus described the invention, what is claimed as new and desired to be secured by Letters Patent is:

1. A sealing device having a casing for surrounding a shaft comprising an annular sealing lip which bears on the shaft, a helically coiled garter spring which surrounds the lip, and a rigid ring floatingly mounted in said casing and surrounding the garter spring and in substantial contact with the latter when said sealing lip is in sealing contact with said shaft, so that radial outward deflection on one side of the sealing lip and garter spring will cause said ring, by pressure of the garter spring thereon, to be moved radially outwardly on the said side and radially inwardly on the opposite side and thus cause the garter spring to be adjusted for maintaining a sealing pressure entirely around the sealing lip.

2. A sealing device having a casing surrounding a shaft, said casing enclosing an annular sealing lip which bears on the shaft, a helically coiled garter spring which surrounds the lip, and a rigid ring floatingly mounted in said casing around the garter spring and in substantial contact therewith to prevent the garter spring from being distorted outwardly, and means within said casing for preventing the rigid ring from moving laterally out of engagement with the garter spring.

3. A sealing device adapted to be mounted in a casing surrounding a shaft, comprising an annular sealing lip which bears on the shaft, a helically coiled garter spring surrounding and in contact with the lip, and a rigid ring floatingly mounted in said casing around the garter spring and in substantial contact therewith to prevent the garter spring from being distorted outwardly, and means adjacent said ring for preventing the latter from moving laterally out of engagement with the garter spring, said ring being of smaller internal diameter than the outside diameter of said garter spring.

ARTHUR WARING.

REFERENCES CITED

The following references are of record in the file of this patent:

UNITED STATES PATENTS

| Number | Name | Date |
|---|---|---|
| 1,995,813 | Olson | Mar. 26, 1935 |
| 2,070,638 | McCombs | Feb. 16, 1937 |